March 20, 1973 G. C. KRAMER 3,721,833
ELECTRONIC INCIDENCE AND COINCIDENCE SAFETY CONTROL CIRCUIT
Filed Aug. 30, 1971

United States Patent Office 3,721,833
Patented Mar. 20, 1973

3,721,833
ELECTRONIC INCIDENCE AND COINCIDENCE SAFETY CONTROL CIRCUIT
George C. Kramer, Danbury, Conn., assignor to Branson Instruments, Incorporated, Stamford, Conn.
Filed Aug. 30, 1971, Ser. No. 175,927
Int. Cl. H01h 47/00; H03k 5/20
U.S. Cl. 307—232                                              7 Claims

ABSTRACT OF THE DISCLOSURE

An electronic safety control circuit is described wherein input signals for initiating the operation of equipment must occur within a predetermined time of one another. A pair of delay circuits are employed which are energized in response to switch closures. One of the delays is connected to delay equipment operation until the circuitry has decided whether the input signals occurred within the time period set by the other delay. A failure of the input signals to occur during the prescribed time prevents equipment operation.

FIELD OF THE INVENTION

The invention relates to a safety control circuit for operating equipment such as an electronic ultrasonic welder, a punch press, and the like.

SUMMARY OF THE INVENTION

In a safety circuit in accordance with the invention, a timer provides a time "window" of predetermined duration during which more than one input signal must occur to effect a desired operation of equipment. If all the required input signals do not occur during the prescribed time period an inhibitor circuit goes into effect to prevent equipment operation.

As described with respect to a preferred embodiment of the invention, a pair of delay circuits are employed. Both delay circuits are energized (i.e., enter a delay mode) in response to an input signal. A first delay circuit is connected to commence equipment operation, and the other delay circuit is connected to prevent the first from coming out of its delay mode if another input signal does not occur within a predetermined time period.

The safety control in accordance with the invention provides significant immunity from spurious electrical interferences and is substantially free from physical disturbances such as vibration and accidental generation of an input signal. When dual palm buttons or similar dual hand-operated initiators are used, the safety control enhances operator safety since both hands must be at a safe place during a particular time in order to commence equipment operation.

DETAILED DESCRIPTION OF THE PREFERRED EMBODIMENT

Figure 1:
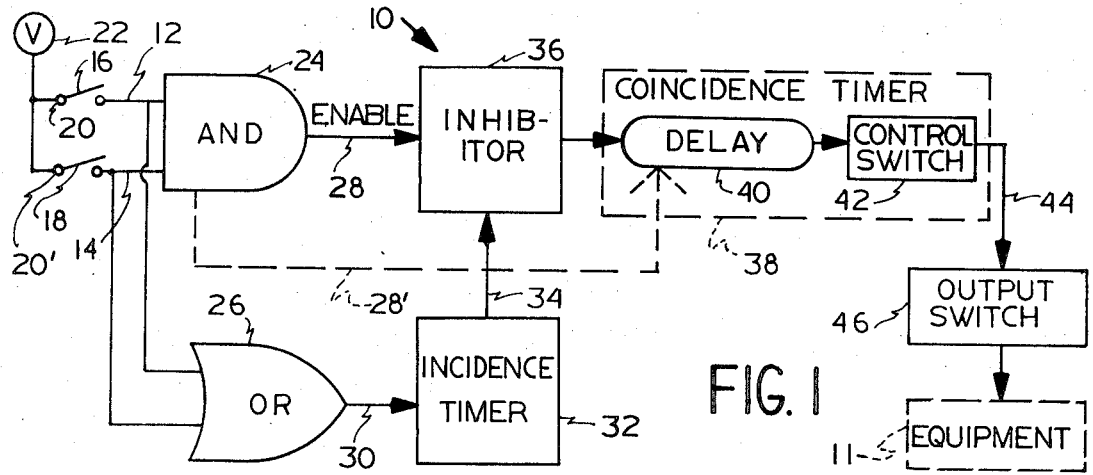
FIG. 1 is a block diagram for a safety control in accordance with the invention.

With reference to FIG. 1, a safety control circuit 10 is shown coupled to operate equipment 11. A pair of input signals are produced on input lines 12 and 14 by initiators 16 and 18, which may be palm push-button switches, photocells, or other input signal generating devices. As shown in FIG. 1, the initiators 16, 18 are switches having contacts 20–20' connected to a common voltage source 22.

Input lines 12 and 14 are coupled to an AND circuit 24 and an OR circuit 26. The AND circuit 24 produces as an output an enabling signal on output line 28 when both initiators 16 and 18 are energized. The OR circuit 26 produces an output signal on output line 30 when either one of the initiators 16 or 18 has been activated.

The output line 30 from the OR circuit 26 is applied to an incidence timer network 32 which, when it receives the signal on line 30, responds by entering a delay mode. The delayed output of the timer network 32 provides an inhibit signal on line 34 to an inhibit network 36. The AND circuit output line 28 is coupled through the inhibitor network 36 to a coincidence timer circuit 38.

The coincidence timer 38 includes a delay 40 which is connected to activate a control switch 42. The control switch 42 in turn provides a single pulse output on line 44 to energize an output switch 46 which operates equipment 11. The delay 40 serves to prevent equipment 11 from being energized until both input signals on lines 12 and 14 occur.

But equipment 11 can not be operated unless both input signals on input lines 12, 14 occur within the time period determined by the delay of the incidence timer 32. If such condition does not occur within this prescribed time period, the incidence timer will, when it comes out of the delay mode, provide an inhibiting signal on line 34 to inhibit circuit 36 and thus prevent equipment operation.

If only one of the input signals occurs within the period of circuit 32, one of two things happens. If the only signal presented to AND gate 24 is the one on line 12, the gate 24 is simply not enabled, and circuit 40 is therefore not activated at all. On the other hand, at least in one particular embodiment of the invention, the internal circuitry of gate 24 is such that, if the signal on line 14 is the only one presented, an output appears on a line 28' emerging from 24. The signal on line 28' activates circuit 40, but causes the latter to produce a substantially longer delay interval, compared to the interval which that circuit produces when activated through circuit 36. The long delay period of circuit 40 exceeds the delay period of timer 32. Therefore, when only one input is present on line 14, timer 32 activates inhibitor 36 before the delay circuit 40 can time out. As a result, circuit 40 can not activate circuits 42 and 46 to start equipment 11. But when both inputs on lines 12 and 14 are present, the short delay period of circuit 40 is utilized, and expires before the timer 32 finishes its delay. Therefore under such circumstances circuit 40 causes circuits 42 and 46 to activate equipment 11 before timer 32 and inhibitor 36 can prevent it.

Figure 2:
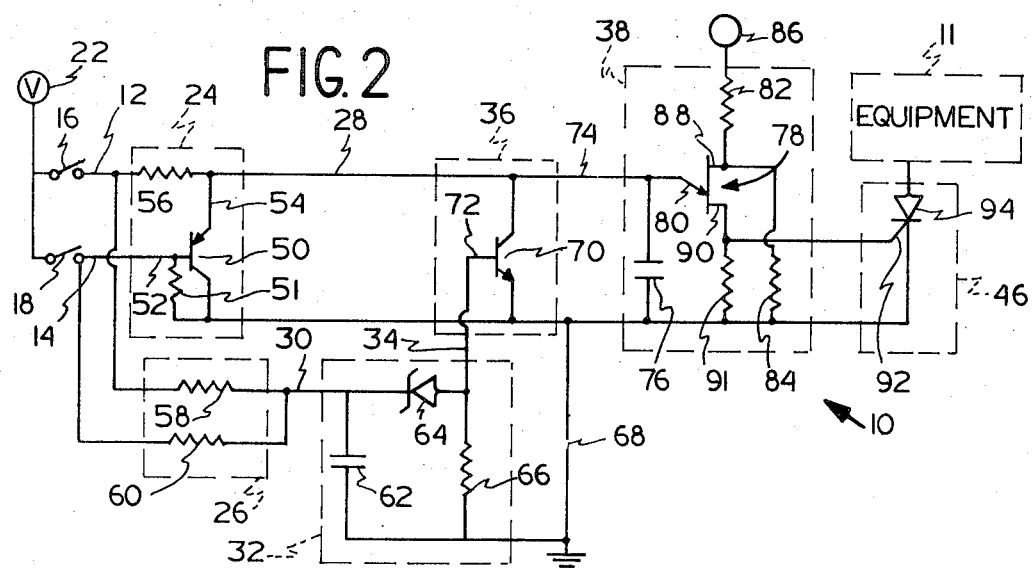
FIG. 2 is an electrical schematic for a safety control circuit as shown in FIG. 1.

The schematic shown in FIG. 2 shows a particular circuit which accomplishes the operation of the safety control circuit of FIG. 1. The AND gate 24 is formed of a transistor 50 whose base 52 is connected to input line 14 and whose emitter 54 is coupled through resistor 56 to the other input line 12.

The input lines 12, 14 are respectively connected to resistors 58, 60 which form a wired OR circuit 26 and have a common output line 30. The incidence timer 32 is formed of an input capacitor 62 connected to the common ground line 68 and a voltage threshold detector, preferably in the form of a Zener diode 64 which is in series between lines 30 and 34. A resistor 66 couples the common junction of Zener diode 64 and line 34 to ground line 68.

The output line 28 of AND circuit 24 couples the enabling signal to inhibitor circuit 36 which is formed of a transistor 70 having its emitter and collector electrodes connected in series between line 28 and ground line 68. The base 72 of transistor 70 is driven by line 34 from the incidence timer 32. The output line 74 of the inhibitor circuit 36 is connected to the input of the coincidence timer 38. The timer 38 includes an input capacitor 76 which forms a programmable delay in cooperation with a unijunction transistor control switch 78. The emitter 80 of the unijunction transistor 78 is connected to line 28. Voltage divider 82, 84 is connected in series between a voltage source 86 and the ground line to provide a bias voltage to one of the bases 88. The output of the coincidence timer 38 is taken from the other base 90 to drive the control electrode 92 of an SCR 94 which is connected to operate equipment 11.

Figures 3A, 3B:
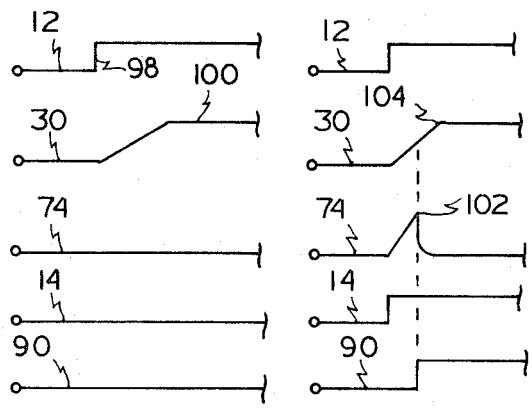
FIGS. 3A, 3B and 3C are timing diagrams illustrating timing relationships of several voltages developed in the electrical circuit of FIG. 2 for different input signal conditions.
Figure 3C:
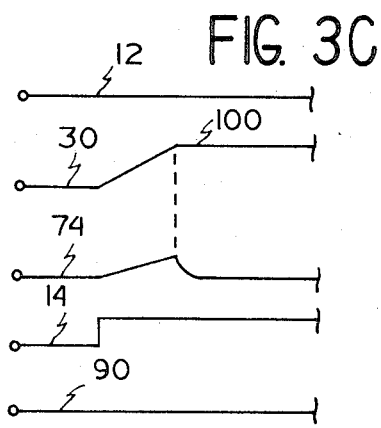

Operation of the safety control circuit 10 may be explained with reference to FIGS. 2, 3A, 3B and 3C wherein the waveforms shown in FIGS. 3A, 3B and 3C represent voltages on lines shown in FIG. 2 and are indicated by the same numerals as are employed in FIG. 2.

Assume that switch 16 only is closed at a time indicated at 98 on waveform 12 in FIG. 3A. Capacitor 62 begins to charge (see waveform 30 in FIG. 3A) through resistor 58 towards the voltage level of source 22 at a charging rate which is a function of capacitor 62 and resistor 58. Transistor 50 is forward biased through resistor 51 and bleeds current through resistor 56 to ground 68, thus not allowing capacitor 76 to charge. Moreover, when the voltage across capacitor 62 reaches the breakdown voltage of Zener diode 64 (at least 100 on waveform 30) current flows into the base 72 of transistor 70, turning it on and thus clamping the voltage on capacitor 76 to ground. As a result capacitor 76 fails to charge to the voltage level needed to trigger unijunction transistor 78, and output base lead 90 to the output switch 46 remains at ground level.

Assume that switch 18 only is closed. Capacitor 62 begins to charge through resistor 60 towards the voltage level of source 22. Capacitor 76 is also charged, but through the series path of resistors 60, 58, and 56 (see waveform 74 in FIG. 3C) and thus rises at a slower rate than the voltage across capacitor 62 (not the different slopes of waveforms 30 and 74 in FIG. 3C). Since the firing voltage of the unijunction transistor 78 is programmed by biasing resistors 82, 84 and the voltage of source 86 so as to be higher than the maximum unijunction emitter voltage permitted by Zener diode 64 and transistor 70 on Zener breakdown, the unijunction transistor does not fire. When the voltage across the capacitor 62 reaches the breakdown voltage of Zener diode 64 (as at 100 on waveform 30 in FIG. 3C) transistor 70 conducts to effectively short the capacitor 76 and prevent operation of equipment 11.

Assume that both switches 16 and 18 are closed, as suggested by waveforms 12 and 14 in FIG. 3B. Capacitor 62 is charges through resistors 58 and 60 towards the voltage level of source 22 and simultaneously capacitor 76 is charged through resistor 56 towards the same voltage. The values of the charging-rate-determining components are chosen so that capacitor 76 will reach the firing voltage of the unijunction transistor 78 as at 102 on waveform 74 in FIG. 3B before capacitor 62 reaches the breakdown voltage of the Zener diode 64 as at 104 on waveform 30 in FIG. 3B. Hence, the unijunction transistor will fire to trigger the SCR 94 and operate equipment 11.

Resistors 56, 82 and 84, voltage sources 22 and 86 and the unijunction transistor 78 are chosen so that the latter then latches to provide a single pulse to SCR 94. Resistor 91 is so chosen that its voltage drop during the latching condition is insufficient to retrigger SCR 94 after it is extinguished.

One may thus appreciate that the safety control circuit of this invention produces a time window during which several input signals must occur to activate equipment. If either of the input signals fails to occur within the prescribed time the equipment cannot be energized and the starting cycle must be repeated.

Since the foregoing description and drawings are merely illustrative, the scope of protection of the invention has been more broadly stated in the following claims; and these should be liberally interpreted so as to obtain the benefit of all equivalents to which the invention is fairly entitled.

The embodiments of the invention in which an exclusive property or privilege is claimed are defined as follows:

1. An electronic safety control circuit comprising:
   an AND circuit responsive to input signals to produce an AND output signal indicative of the simultaneous presence of said input signals,
   a first delay circuit responsive to the AND output signal to deliver a delayed output signal,
   a second delay circuit,
   an OR circuit responsive to the input signals and coupled to the second delay circuit to initiate a delay period upon the first occurrence of an input signal, and
   means for inhibiting said first delay circuit from delivering a delayed output signal when said input signals fail to occur within the delay period of the second delay circuit.

2. A safety control circuit for equipment which is controlled by input signals from operator-actuated devices, comprising:
   an AND circuit and an OR circuit both coupled to receive said input signals;
   a first delay circuit responsive to the output of said AND circuit and producing a delayed output signal at a first predetermined time following said AND circuit output;
   a second delay circuit responsive to the output from said OR circuit and producing an inhibit signal a second predetermined time following activation by said OR circuit;
   and inhibiting means responsive to said inhibit signal for preventing said first delay circuit from producing output signal after said second predetermined time.

3. The safety control circuit of claim 2 wherein said first delay circuit includes a first capacitor and a first resistor, said first resistor being coupled in series with an input signal as part of said AND circuit, and wherein said second delay circuit includes a second capacitor and a second resistance, said second resistance being coupled in series with the input signals as part of said OR circuit.

4. The safety control circuit of claim 3 wherein said second delay circuit includes a voltage threshold detector element coupled between said second capacitor and said inhibiting means to generate said inhibit signal when said second capacitor is charged to the detection threshold of said element.

5. The safety control circuit of claim 3 wherein said inhibiting means includes a switch coupled effectively in shorting relationship with said first capacitor, said switch being connected to be activated by the inhibit signal from sad second delay circuit.

6. The safety control circuit of claim 5 wherein said second delay circuit further includes a switching circuit operatively coupled to said first capacitor to provide an equipment-operating output when said first capacitor is charged to a predetermined voltage level.

7. The safety control circuit of claim 2 including first delay components selected to provide a first charging rate of the capacitive component when all said input signals occur within the second predetermined time period set by said second delay circuit, and a second charging rate slower than said first charging rate when said input signals fail all to occur during said second predetermined time period, and second delay components selected to charge said second capacitive component at a charging rate which is slower than said first charging rate and faster than said second charging rate.

References Cited

UNITED STATES PATENTS

| | | | |
|---|---|---|---|
| 2,962,633 | 11/1960 | Raymond | 317—135 |
| 3,662,227 | 5/1972 | Morrison et al. | 307—232 X |
| 3,170,093 | 2/1965 | Gilbert | 317—135 A |
| 3,577,087 | 5/1971 | Martin et al. | 307—246 X |

STANLEY D. MILLER, JR., Primary Examiner

U.S. Cl. X.R.

307—218, 246, 247 A, 293, 36, 141 S; 328—7